March 29, 1949.  L. D. LETERMAN  2,465,653
JACK
Filed Nov. 7, 1945
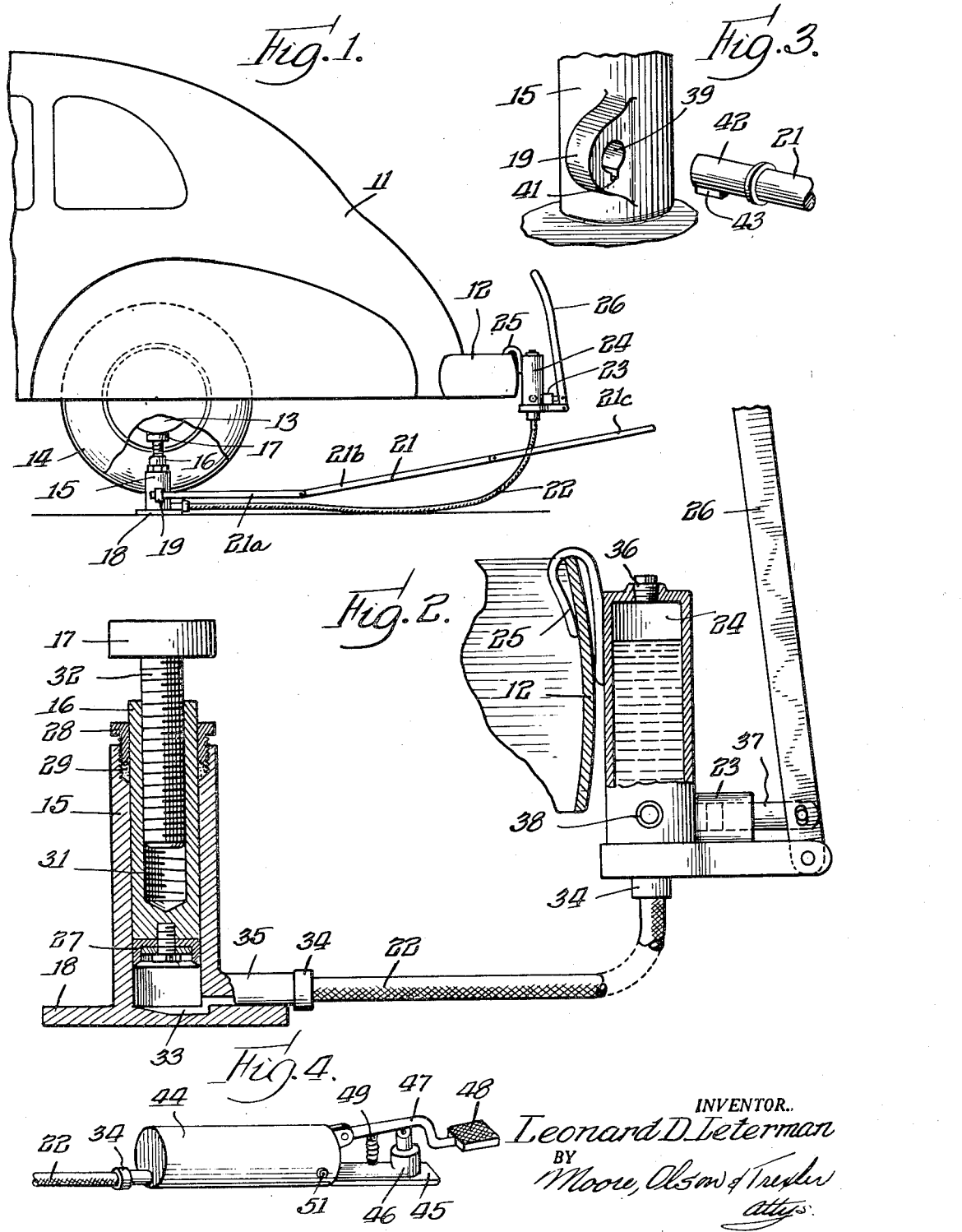
INVENTOR.
Leonard D. Leterman
BY
Moore, Olson & Trexler
attys.

Patented Mar. 29, 1949

2,465,653

UNITED STATES PATENT OFFICE 2,465,653

JACK

Leonard D. Leterman, Chicago, Ill.

Application November 7, 1945, Serial No. 627,213

3 Claims. (Cl. 254—93)

The present invention relates to a vehicle jack and more particularly to an improved hydraulic jack for automobiles.

Modern automotive vehicles, particularly passenger automobiles have changed greatly in design so that at the present time an appreciable portion of the chassis or body overhangs the axles. At first when the design of automobiles included a certain amount of overhang of the chassis or body beyond the axle, it appeared that the solution to the problem of raising the tire or wheel from ground could best be solved by the use of a bumper jack. As however the design of modern automobiles includes even a still greater portion of overhang, it becomes necessary to make the bumper jacks excessively long because of the lever element between the pumper and the axle. An excessively long jack results in an unstable support of the vehicle with the possibility of accidents. Other attempts to overcome this difficulty have included certain mechanical types of jacks with rotatable screw members, but such jacks generally have the disadvantage of having the screw member either exposed or else so positioned that some part of the vehicle ultimately is in such position during the raising operation that the actuating handle or crank cannot be operated properly. It, therefore, becomes evident that it is desirable to provide a solution from the problem of raising the axle of an automobile for tire change and repair which will provide greater security in use and which will avoid interference between the operating parts of the jack and any part of the vehicle. In accordance with the present invention this may be accomplished by providing a hydraulic jack having a weight raising piston adapted to be positioned so as to engage an axle of a vehicle. A suitable positioning control or handle is provided for moving the jack in, under and out from the axle of the automobile. A hydraulic pump positioned some distance beyond the outer limits of the vehicle is provided for supplying the necessary power to the hydraulic weight raising piston to jack up the automobile.

It is therefore an object of the present invention to provide an improved hydraulic jack arrangement for use with vehicles.

It is still another object of the present invention to provide particularly for passenger automobiles an improved hydraulic jack providing greater security and safety in use.

Other and further objects of the present invention subsequently will become apparent by reference to the following description taken in conjunction with the accompanying drawing wherein Figure 1 illustrates the application of the present invention;

Figure 2 shows in partial cross section certain details of the construction of the invention;

Figure 3 is a detailed view illustrating one form of connection between the hydraulic jack and the positioning or control rod; and Figure 4 illustrates another manner of operating a remotely positioned hydraulic pump.

Figure 1 shows the rear portion of an automobile 11 having a bumper 12 and an axle 13. In order to permit the removal of a tire 14, a hydraulic cylinder 15 having a weight raising piston 16 is positioned directly beneath the axle 13. The weight raising piston 16 may be provided with an adjustable saddle or head 17. The cylinder 15 has a suitable base 18 and at one side is provided with a socket 19. A control rod or end 21 is provided for engagement with the socket 19 so that the cylinder 15 may be moved about underneath the car to properly position the saddle 17 for ultimate engagement with the underside of the axle 13.

The hydraulic cylinder 15 is interconnected by a flexible conduit 22 with a hydraulic pump 23 which is associated with the hydraulic reservoir 24. In Figure 1 the hydraulic reservoir 24 and the pump 23 are mounted on the bumper 12 by a suitable clamp or hook 25. The pump 23 is actuated by a suitable handle or lever 26.

The hydraulic cylinder 15 as may be seen from Figure 2 is mounted in a vertical position upon a supporting base 18 and contains a weight raising piston 16. The piston 16 at its lower end may be provided with a suitable packing ring or cup washer 27. The upper portion of the cylinder 16 bears against a guide member 28 which is threaded into the cylinder 15 and which may also serve to compress a packing gland 29. The piston 16 is provided with a threaded hollow interior 31 for cooperation with a threaded stem or rod 32 which supports the head or saddle 17. Normally just prior to use of the jack, the piston 16 is at its lowermost position. In order that a minimum amount of movement of the piston may be required for the raising of the vehicle, the head 17 is rotated so as to actuate the threaded shaft 32 and raise the head a certain distance allowing just sufficient clearance between the head or saddle 17 and the axle 13. Thereafter the weight raising piston is positioned beneath the axle so that a relatively small movement of the piston will bring the saddle 17 quickly in engagement with the axle 13. The cylinder 15 is provided with a fluid passage 33 which is in communication with the flexible fluid conduit 22. Preferably the fluid conduit 22 is of a construction having a braided metal covered outer surface so as to withstand the hydraulic pressure and also to protect the conduit against damage. The conduit 22 is provided at each end with suitable connecting nipples 34 which are threaded into suitable openings adjacent the cylinder 15 and the pump 23. The base 18 may be provided with a suitable boss 35 having the necessary threaded opening for accommodating the nipple 34 and providing the fluid passage 33 which communicates with the interior of the cylinder 55. The nipple 34 therefore is tightened so as to be relatively permanently connected thereto.

The bumper 12 is engaged by a hook or resilient retainer or clamp 25 which is connected to the outer surface of a hydraulic fluid reservoir 24 which may be provided with a suitable filler plug 36. A hydraulic pump 23 is in fluid communication with the hydraulic reservoir 24. A suitable valve structure not shown but of conventional design as is well understood by those skilled in the art is interposed between the cylinder of the pump 23, and the flexible fluid conduit 22. The handle 26 actuates the piston or piston rod 37 of the pump 23 to supply fluid under pressure from the reservoir 24 to the conduit 22. A bypass passage and valve are provided between the fluid conduit 22 and the reservoir 24. When it is desired to permit the weight raising piston 31 to be lowered, a manually operable valve member 38 is actuated to open the by-pass passage between the fluid conduit 22 and the reservoir 24 thus permitting the fluid which previously had been supplied to the inner cylinder 15 to return to the reservoir 24.

Figure 3 shows one manner in which the weight raising cylinder 15 may be provided with a boss 19 having a socket 39 which may be provided with a keyway 41. The socket 39 and the keyway 41 are complementary to the cylindrical end 42 and the key 43 at the end of the first link of the positioning or control rod 21. Preferably for storage purposes the control rod 21 is made in a plurality of sections. For example this control rod may have a first section 21a which carries the cylindrical end portion 42 and the key 43 for insertion into the socket 19. The key 43 is moved all the way through the keyway 41 and thereafter the rod portion 42 may be rotated through a small angle so that the key 43 will insure retention of the rod in position for backward movement of the hydraulic cylinder 15. The first section 21a of the control rod may be jointedly connected to succeeding sections 21b and 21c. Preferably the latter two sections 21b and 21c are so constructed that these sections may be folded and yet for purposes of use may be locked so as to provide a single rigid unit. With this unit 21 the jack cylinder may be moved in any direction to properly position the saddle 17 under the axle 13 or to remove the cylinder therefrom.

During periods of non-use the control rod or handle 21 is folded into shorter links for storage. The flexible conduit 22 is coiled up or may be wound about one or both of the two units. The handle 26 if desired may be made demountable for storage.

In place of mounting the reservoir 24 by a grip or hook 25 on the bumper of the automobile the reservoir may be located in the manner shown in Figure 4. In this instance a horizontal reservoir 44 is provided with a base 45 which carries a pump 46. An actuating lever 47 is provided with a treadle portion 48 for engagement by the foot. A suitable spring 49 is provided to raise the treadle 48 to its upper position so that in order to supply fluid to the conduit 22 it is merely necessary to repeatedly step upon the treadle 48. A manually operable valve member 51 is provided for controlling the by-pass between the fluid passage interconnecting the pump 46 and the conduit 22 so that the pressure supplied to the conduit 22 may be released to return the fluid to the reservoir 44.

While for the purpose of describing and illustrating the present invention certain specific embodiments have been shown in the drawing, it is to be understood that the invention is not to be limited thereby since such variation in the construction and in the arrangement of the parts is contemplated as may be commensurate with the spirit and scope of the invention set forth in the following claims.

This invention is hereby claimed as follows:

1. A hydraulic jack for automobiles comprising a hydraulic cylinder having a weight raising piston provided with an adjustable member adapted to engage the axle of an automobile, removable folding handle means for positioning said cylinder under said axle, a remotely positioned hydraulic fluid reservoir, a hydraulic pump located adjacent and in communication with said reservoir, a manually operable vertical lever for actuating said pump, a flexible braided metal covered fluid conduit interconnecting said pump and said piston cylinder, and demountable support means for securing said pump and said reservoir on the bumper of said automobile.

2. A hydraulic jack for automobiles comprising a hydraulic cylinder having a weight raising piston, an adjustable screw member mounted on said piston and adapted to engage the underside of a part of an automobile, a handle socket connected to said hydraulic cylinder, removable control handle means cooperating with said socket for positioning said cylinder under the axle, a remotely located hydraulic fluid reservoir, a remotely located hydraulic pump, clip means for supporting said reservoir beyond the chassis of the automobile on the bumper thereof, and a flexible braided metal covered fluid conduit interconnecting said pump and said piston cylinder.

3. A hydraulic jack for automobiles comprising a vertical hydraulic cylinder having a weight raising piston provided with adjustable extension means adapted to engage the underside of the axle of the automobile, a remotely positioned hydraulic fluid reservoir, a hydraulic pump mounted adjacent said reservoir, a flexible braided metal covered fluid conduit fixedly connected at one end to said pump and at the other end to said piston cylinder, means for demountably attaching said reservoir and said pump on the bumper of the automobile, a handle engaging means mounted on said vertical cylinder, and a removable handle therefor for positioning said cylinder with respect to the axle of the automobile.

LEONARD D. LETERMAN.

REFERENCES CITED

The following references are of record in the file of this patent:

UNITED STATES PATENTS

| Number | Name | Date |
|---|---|---|
| 974,988 | Northam | Nov. 8, 1910 |
| 1,465,278 | Melchoir | Aug. 21, 1923 |
| 2,086,788 | Wolff | July 13, 1937 |
| 2,380,152 | David | July 10, 1945 |